United States Patent [19]

Kirchberg, Jr. et al.

[11] Patent Number: 5,001,622
[45] Date of Patent: Mar. 19, 1991

[54] ENHANCED REAL-TIME CONTROL OF PWM INVERTER

[75] Inventors: Maurice A. Kirchberg, Jr., Dubuque, Iowa; Alexander Cook, Rockford, Ill.

[73] Assignee: Sundstrand Corporation, Rockford, Ill.

[21] Appl. No.: 521,742

[22] Filed: May 10, 1990

[51] Int. Cl.$^5$ .............................................. H02M 7/48
[52] U.S. Cl. ........................................ 363/95; 363/96; 363/98; 363/41
[58] Field of Search ........................ 363/95, 96, 97, 98, 363/41, 132, 137

[56] References Cited

U.S. PATENT DOCUMENTS

| | | | |
|---|---|---|---|
| 4,337,429 | 6/1982 | Stuart | 318/811 |
| 4,357,655 | 11/1982 | Beck | 318/811 |
| 4,520,437 | 5/1985 | Boettcher et al. | 363/98 |
| 4,527,222 | 7/1985 | Glennon | 363/95 |
| 4,595,976 | 6/1986 | Parro | 363/98 |
| 4,635,177 | 1/1987 | Shekhawat et al. | 363/98 |
| 4,722,042 | 1/1988 | Asano et al. | 363/96 |
| 4,800,478 | 1/1989 | Takahashi | 363/98 |

Primary Examiner—Steven L. Stephan
Assistant Examiner—Jeff Sterrett
Attorney, Agent, or Firm—Whitham & Marhoefer

[57] ABSTRACT

In a pulse width modulated inverter, the fit of a selected switching angle is monitored by counting zero crossings in a neighborhood of the function $$\int_0^{2\pi} F(x)\sin(nx)$$

for each harmonic of interest. If the fit is bad, a switching angle is moved to improve the fit.

12 Claims, 6 Drawing Sheets

ENHANCED REAL-TIME CONTROL OF PWM INVERTER

BACKGROUND OF THE INVENTION

1. Field of the Invention

The present invention generally relates to pulse width modulated (PWM) inverters and, more particularly, to an enhanced real-time control of a PWM inverter which monitors output harmonics and reduces output harmonics by a vernier change in position of a single switching angle.

2. Description of the Prior Art

PWM inverters are employed to convert direct current (d.c.) to alternating current (a.c.). In many applications, it is important to carefully regulate the quality of the a.c. generated by the inverter. Accordingly, it is customary to define a point of regulation (POR) downstream of the inverter at which the voltage and current of the a.c. signal generated by the inverter is sampled. The sampled voltage and current would be used to select appropriate PWM switching patterns to minimize distortion at the POR. Based on the voltage and current sensed at the POR, and in some systems also link ripple, an inverter controller selects one PWM pattern from a number of stored patterns (or creates a pattern in real time) to provide the least harmonic distortion at the POR. As real and reactive power factors of electrical loads coupled to the inverter change, the PWM pattern used to control to the inverter switches change. A PWM pattern comprises a set of switching transients which, when applied to a d.c. signal via an inverter, produces alternating pulses which, when filtered, approximates a sinusoidal a.c. signal. The pulses in a PWM pattern are of varying width. Normally, the inverter can adequately reproduce the PWM pattern and thereby create an accurate approximation of a sinusoidal a.c. signal from the d.c. voltage. However, under some load conditions (particularly when loads are unbalanced or have particular real or reactive power components), the inverter controller selects a PWM pattern which has switching transients defining pulses which cannot be faithfully reproduced by the inverter due to physical limitations of transistor switches therein. In other words, the transistor switches within the inverter have physical limitations which manifest themselves, among other ways, in a minimum allowable switching time. Thus, should the inverter switch be called upon to switch faster than it is able, it will be unable to do so and, therefore, will be unable to faithfully reproduce a part of the PWM pattern required to maintain the least distortion at the POR. Accordingly, under some conditions, the POR cannot be regulated due to physical limitations of the transistor switches in the inverter. In addition, the wide range of link ripple and load variation require more patterns than can economically be stored if a reasonable degree of regulation is required. Thus, it is not practical to select a new pattern for small changes in load conditions.

Prior inventions have addressed schemes for controlling current and voltage at the POR. Representative of such inventions is U.S. Pat. No. 4,527,226 to Glennon, which discloses an inverter control system for a PWM inverter circuit. This circuit comprises an angle set look up table and selection logic for addressing the look up table. The angle set defining the inverter output waveform is selected in response to various operating conditions of the inverter.

An earlier patent to Glennon, U.S. Pat. No. 4,382,275, is directed to a PWM inverter having an output signal with reduced harmonic content, wherein a filtered fundamental PWM signal is summed with a controlled signal.

U.S. Pat. No. 4,595,976 to Parro, II discloses an inverter control which is an enhancement of the Glennon inverter control. More specifically, the table look up is implemented as a plurality of memories, one for each phase, each of which is subdivided into a plurality of memory blocks which store a number of bytes. Memory address decoding logic addresses a particular memory block in each memory in accordance with a control signal representing the desired waveform to be generated at each phase output. Thus, the Parro, II inverter control accomplishes individual phase regulation of the inverter output.

U.S. Pat. No. 4,635,177 to Shekhawat et al., discloses a further refinement of the basic Glennon inverter control system. More specifically, the Shekhawat et al., control permits on-line generation of PWM patterns for a neutral point clamped PWM inverter. A microprocessor and memory are coupled to the generating circuitry for calculating switching points for the inverter switches during operation of the inverter. Timer modules are coupled to the microprocessor for developing switch points so that the switches are operated to reduce the distortion of the inverter output signal.

U.S. Pat. No. 4,480,299 to Muto et al., also discloses a microprocessor controller inverter control. However, the Muto et al., PWM inverter is controlled by the use of the fundamental wave voltage of the inverter output as a feedback quantity. Muto et al. fail to show any apparatus for directly dealing with the physical limitations within the inverter itself.

Other patents related to the art of inverters include U.S. Pat. Nos. 3,648,150 to Kerick et al., and 4,626,979 to JaQuay. The Kerick et al., patent discloses an apparatus for comparing a filtered output of a PWM inverter with a reference waveform and generating output voltage signal to control the inverter drive circuit to produce an output waveform substantially duplicating the reference waveform. The JaQuay patent is similar to the Kerick et al. patent in that it is directed to a PWM inverter, including a comparator for comparing an output voltage with the sum of a reference voltage and a maximum allowable ripple voltage.

Also representative of the prior art are U.S. Pat. Nos. 4,646,221 to Sekino et al., 4,757,434 to Kawabata et al., 4,800,478 to Takahashi, and 4,757,432 to Hancock. The patent to Sekino et al., is directed to a controlling circuit which monitors the output waveform of the inverter and controls the firing of the switch elements in the inverter to restore it to a sinusoidal waveform in the event that it is distorted by nonlinear loads. The patent to Kawabata et al., is directed to a control circuit for a current control minor loop which monitors the instantaneous value of the output current of the power conversion apparatus and adjusts it to the current reference value. The patent to Takahashi is directed to a control for an inverter, wherein an evaluation function on the whole combination of the inverter and the load connected to the a.c. side of the inverter is minimized. The patent to Hancock is directed to a device for time integrating the difference between the electrical output and the reference by varying the switching frequency in the inverters so as to null the time integrated difference in a feedback control loop.

SUMMARY OF THE INVENTION

It is, therefore, an object of the present invention to provide an inverter controller which distortion in the output waveform caused by minor changes in d.c. link ripple and/or load.

It is another object of the invention to provide a controller for a pulse width modulator inverter which monitors the "goodness of fit" for a selected switching pattern solution.

Briefly, this invention contemplates the provision of a pulse width modulated inverter in which different modulation patterns are stored, and a particular one of the patterns selected to eliminate (or reduce) harmonic distortion in the output waveform for a particular load and/or link ripple condition. Each stored pattern is developed to provide a zero value (or a predetermined value) for each of the harmonic components of interest in the inverter output waveform. In accordance with this invention, the suitability of the selected waveform is monitored to determine in real time if the harmonic content of the output waveform exceeds certain limits; a "goodness of fit" test. If the fit is not good, as, for example, may happen if there is a load change too small to call for a different modulating pattern, a single set of switching angles (called herein the vernier switching angle) in the modulating pattern may be changed in order to improve the fit. Any suitable switching angle in the pattern may be selected as the vernier switching angle; for example, the switching angle which can be changed the most without interfering with adjacent switching angles, or the switching angle to which the harmonic content of the output is most sensitive.

The "goodness of fit" is monitored by monitoring zero (or a design value) crossings in a defined neighborhood of a function equal to the integral of the product of the output of the inverter (F(x)) and sin nx (for patterns of even symmetry) for each harmonic n of interest (although not necessarily all harmonics of interest) over one complete cycle of the fundamental. Conveniently, the integration may start with a positive going crossing of the fundamental or at vernier switching angle. In the case of the positive gain crossing of the fundamental, the neighborhood extends from plus and minus pi/n radians centered at 2 pi. There is a good fit where there is a zero crossing in the respective neighborhood for each harmonic of interest evenly distributed on either side of the midpoint. If the fit is not good, the vernier switching angle may be changed to improve the fit.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
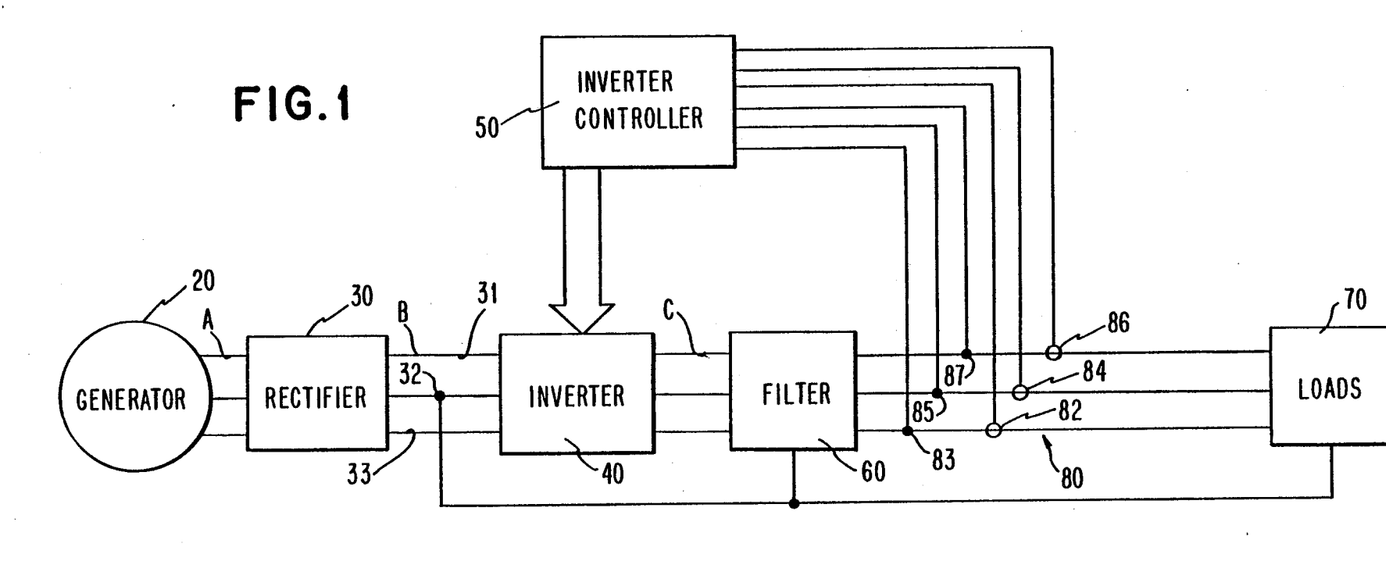
FIG. 1 is a block diagram of a variable speed constant frequency system embodying the invention.

Referring now to the drawings, and more particularly to FIG. 1, there is shown a block diagram of the variable speed constant frequency (VSCF) system embodying the present invention. A generator 20 is mechanically coupled to a variable speed prime mover (not shown) which may be, for example, an aircraft engine. The generator 20 produces power of a frequency which varies as a function of the speed of the prime mover. The resulting a.c. power produced by the generator 20 is therefore termed "wild frequency" a.c. power and is unsuitable for use by aircraft electrical systems or loads, which is the preferred environment for the operation of the VSCF system.

Accordingly, the VSCF system is designed to convert the "wild frequency" a.c. power produced by the generator 20 into constant frequency a.c. power, typically at a frequency in the range of 400 Hz, for use by aircraft electrical systems. "Wild frequency" a.c. power produced by the generator 20 is fed to a rectifier 30 which rectifies the a.c. power into positive and negative d.c. voltages. The d.c. voltages are produced on a d.c. link having a positive d.c. rail 31 and a negative d.c. rail 33. An inverter 40, under control of an inverter controller 50 produces, by pulse width modulation in the preferred embodiment, a PWM waveform from the d.c. voltages which is fed to the filter 60. The filter 60 smooths the PWM waveform produced by the inverter 40 into an approximation of a sinusoidal constant frequency a.c. output which is fed to the aircraft electrical loads 70.

In the preferred embodiment of the invention, the wild a.c. power output by the generator 20 is three-phase a.c. power. The constant frequency a.c. power generated by the inverter 40 is likewise three-phase. In the preferred embodiment of the invention, the inverter is provided with a neutral point via lead 32 coupled to an output phase of the filter 60.

Figure 2:
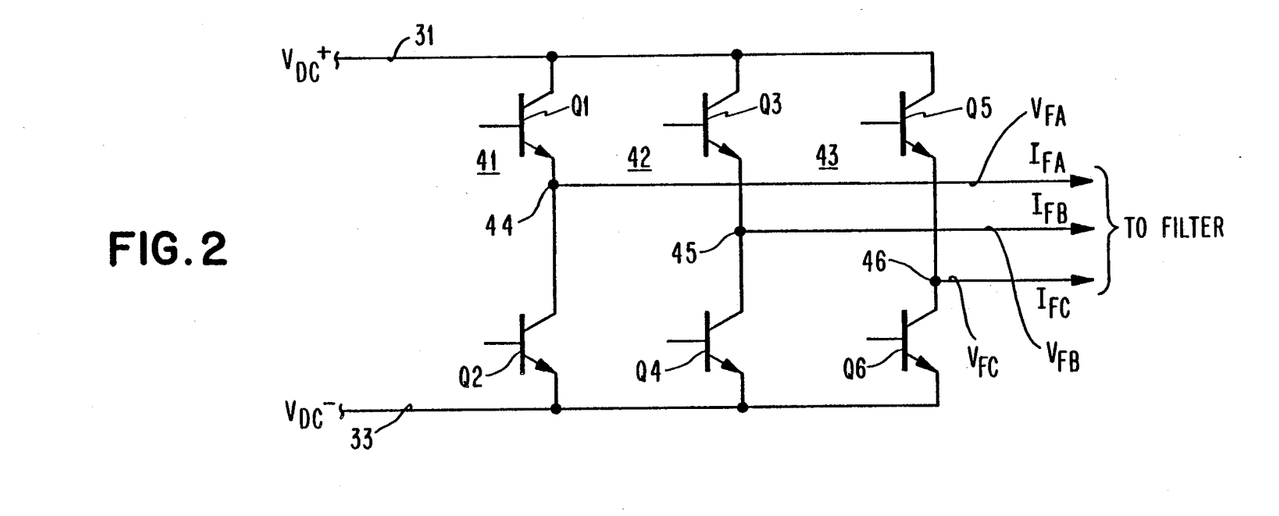
FIG. 2 is a simplified block and schematic diagram of a typical three-phase inverter.

Referring to FIG. 2, the inverter 40 includes three inverter legs 41, 42 and 43, each comprising two controllable power switches, such as switches $Q_1$ and $Q_2$, which are connected in series across the positive and negative d.c. rails 31 and 33.

Referring specifically to the inverter leg 41 as an example, the switches $Q_1$ and $Q_2$ are operated in accordance with a PWM waveform pattern developed by the inverter controller 50. Likewise, phase outputs $V_{FB}$, $I_{FB}$ and $V_{FC}$, $I_{FC}$ are produced at the junctions 45 and 46, respectively, by operation of the switches $Q_3$, $Q_4$ and $Q_5$, $Q_6$ in the inverter legs 42 and 43.

Referring back to FIG. 1, the inverter controller 50 responds to signals sensed from a point of regulation (POR), indicated generally as 80, which is located downstream of the filter 60. Current is sensed by current transformers 82, 84 and 86 which sense each of the three phase currents produced by the filter 60, respectively. Likewise, voltages are sensed by taps 83, 85 and 87 applied to each of the three phases produced by the filter 60. Each of the signals appearing at the current transformers 83, 84 and 86, and taps 83, 85 and 87, is fed to the inverter controller 50 and is used to select or generate an appropriate PWM switching pattern. Depending on the real or reactive components of the power requirements of the loads 70, the inverter controller 50 selects from memory or creates in real time a PWM pattern which, when applied to the inverter 40 and filtered by the 60, produces an approximate sinusoidal a.c. output waveform which is optimized to have the least distortion at the POR 80. The method and apparatus for determining a basic switching pattern may be as disclosed in the prior art, e.g. U.S. Pat. No. 4,527,226 to Glennon, or in accordance with applicants, co-pending application Ser. No. 503,377, filed Apr. 21, 1990.

Figure 3:
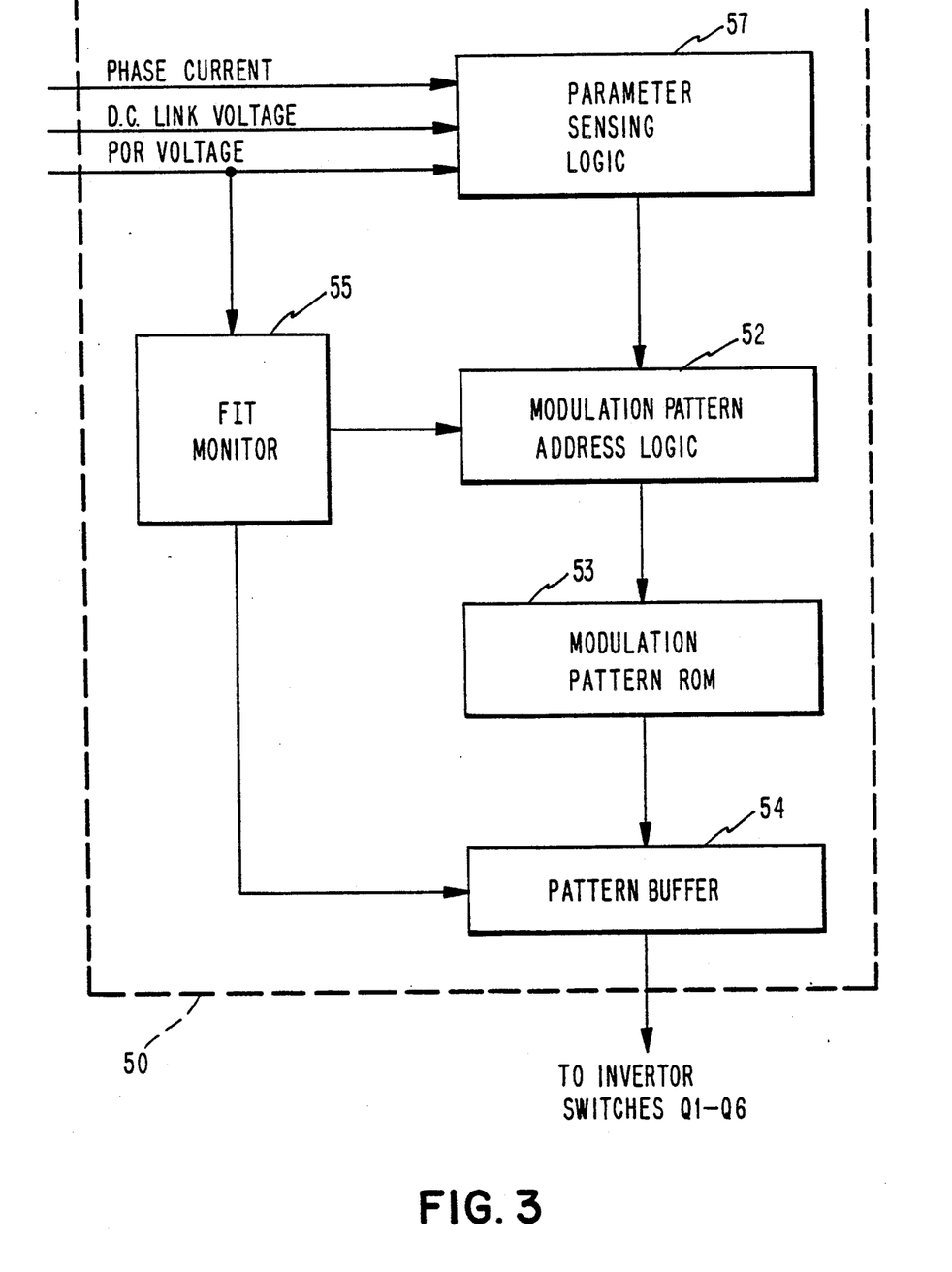
FIG. 3 is a simplified block diagram of the inverter controller shown in FIG. 1.

Referring now to FIG. 3, there is illustrated in block diagram form the inverter control 50 shown in FIG. 1. The inverter control 50 develops operating signals for switches in inverter 40 to produce one of a plurality of PWM outputs in accordance with the sensed parameters. The inverter control 50 includes parameter sensing logic 51 which senses the various operating parameters of the inverter, including the currents developed in each of the phase outputs of the inverter, the phase voltages at the POR, and the voltage across the d.c. links 31 and 33. The parameter sensing logic 51 generates outputs to the angle set generator which comprises address logic 52 and a pattern ROM. The address logic 52 generates addresses to the ROM 53 which produces a time sequence of switching signals to control the inverter switches $Q_1$ to $Q_6$. The selected pattern is held in a buffer 54 so that the switching angle of one of the switching signals (called herein the vernier switching angle) may be adjusted in response to a vernier adjust signal from a fit monitor 55.

Referring back to FIG. 1 once again, the PWM switching pattern produced by the inverter controller 50 is a collection of switching angles, or times, which is used to operate individual transistor switches of the inverter 40. Accordingly, when one knows the current and voltage of the POR 80, one can then determine the nature of the loads 70 (e.g., real and reactive power components and balance of the loads), and can select, or generate, a suitable pattern to control the inverter 40 to minimize distortion at the POR 80.

The subject invention is an extension of the known technique for inverter control previously described.

Figure 4:
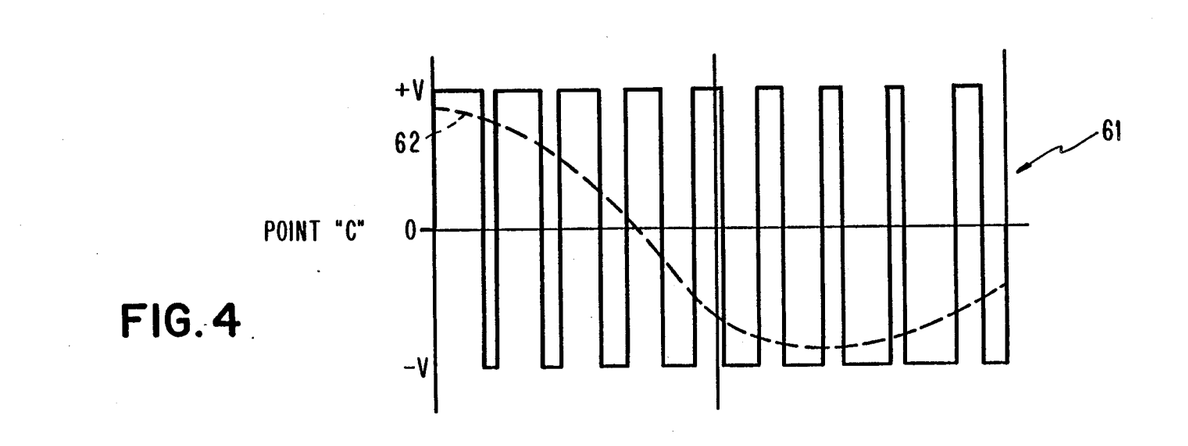
FIG. 4 is a graph representing a controlled inverter output pattern signal taken at point "C" of FIG. 1.
Figure 5:
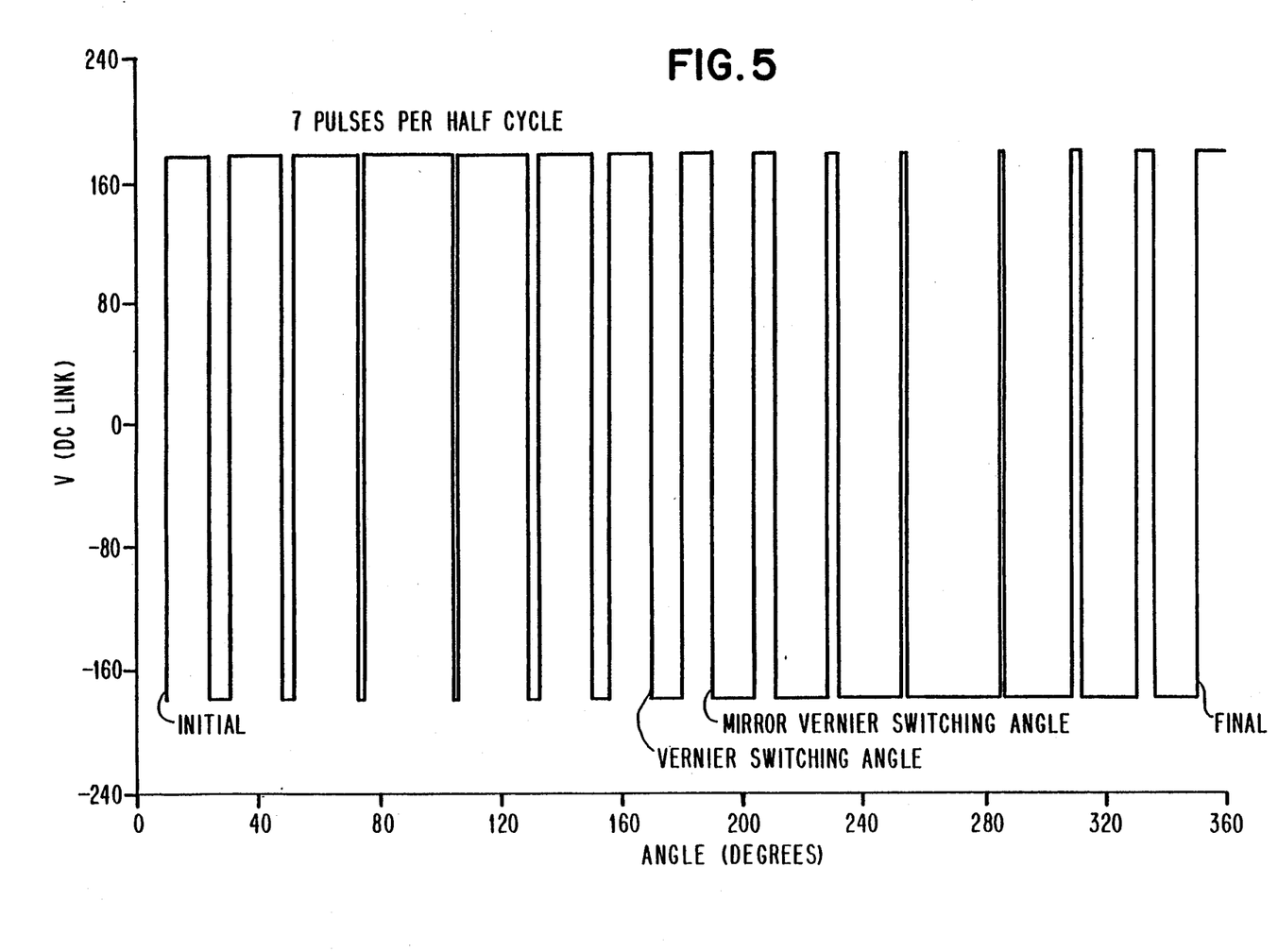
FIG. 5 is graph showing a typical inverter output pattern having seven pulses per half cycle.

FIG. 4 represents the inverter output signal indicated generally as 61 and taken at point "C" in FIG. 1. The signal 61 comprises a plurality of positive and negative pulses of varying widths. When filtered, the waveform is approximately sinusoidal as represented by dotted line 62. FIG. 5 shows a typical actual inverter output pattern with seven pulses per half cycle; a controlled or vernier switching angle, labeled as such in FIG. 5, is at approximately 170°. Owing to mirror symmetry, the angle labeled "mirror vernier switching angle" at approximately 190° is also controlled. Preferably, the initial and final switching angles are also controlled, as it is advantageous to start the period of integration with the zero crossing of the fundamental.

Figure 6:
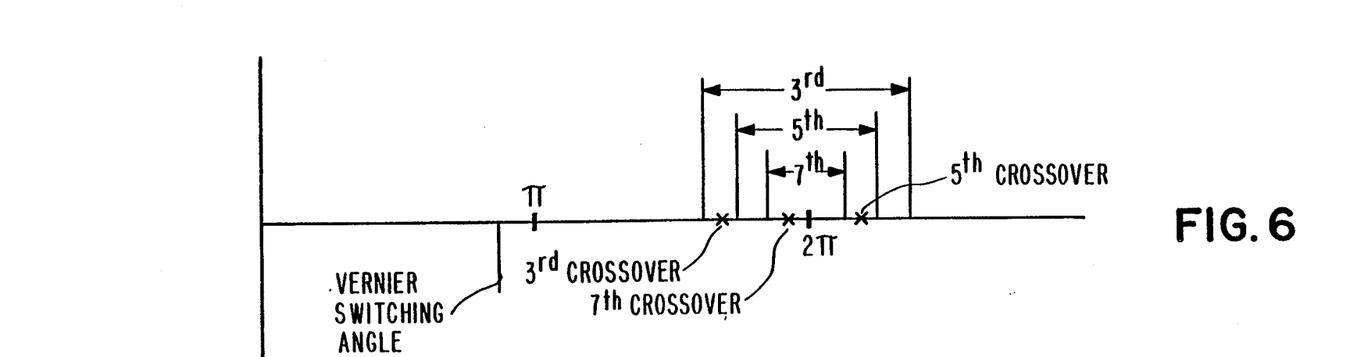
FIG. 6 is a diagram illustrating the principles of this invention for the third, fifth and seventh harmonics.

Referring now to FIG. 6 as well as to FIG. 5, the Fit Monitor 55 determines a "goodness of fit" by detecting zero crossings in a defined neighborhood of the integral of the product of the inverter output F(x) (either before or after filtering), and SIN (nx) (where n is the harmonic of interest). FIG. 6 graphically illustrates the "neighborhood" for the third, fifth and seventh harmonics; the neighborhood extends plus and minus pi/n about a midpoint at 2 pi. Preferably, the integration period starts with the positive going zero crossing of the fundamental. It will be appreciated that the integration period does not necessarily have to start with the fundamental. However, if it does not, sin and cosine terms must be considered.

FIG. 6 illustrates a good fit. There is a ZERO crossing in the respective neighborhood for each harmonic of interest and they are evenly distributed on either side of the midpoint. Here it should be noted that since the design of the pattern is such that integral for harmonics of interest is zero (or a design value), the functions theoretically cross at 2 pi. The establishment of a neighborhood in which crossings are detected accounts for real world conditions in which the crossing point will vary even if the harmonic content of the output is satisfactory. In general, the number of neighborhood crossings should equal the number of controlled harmonics for a good fit, preferably with a balance of crossings before and after the midpoint of the neighborhood.

In the case where the number of zero crossings is less than the number of harmonics of interest or the crossovers are unbalanced with respect to the midpoint, the position of the vernier switching angle, its mirror angle, and the initial and final angles can be varied in order to lower the harmonic content of the output and improve the fit. Preferably the vernier switching angle is either the angle to which the output harmonic content is most sensitive, or the angle which permits the widest change without interfering with adjacent switching events. The angle to which the harmonic content is most sensitive may be determined empirically either on the basis of its sensitivity to a single harmonic or its sensitivity to all harmonics of interest. The event which admits of the greatest range of change may be determined by examining all sets of three consecutive switching events. A given set of three events has two related consecutive differences, and of these two related differences, there is a minimum difference. The midpoint of that set of three switching events which gives the greatest minimum distance admits of the widest range of adjustment.

Figure 7:
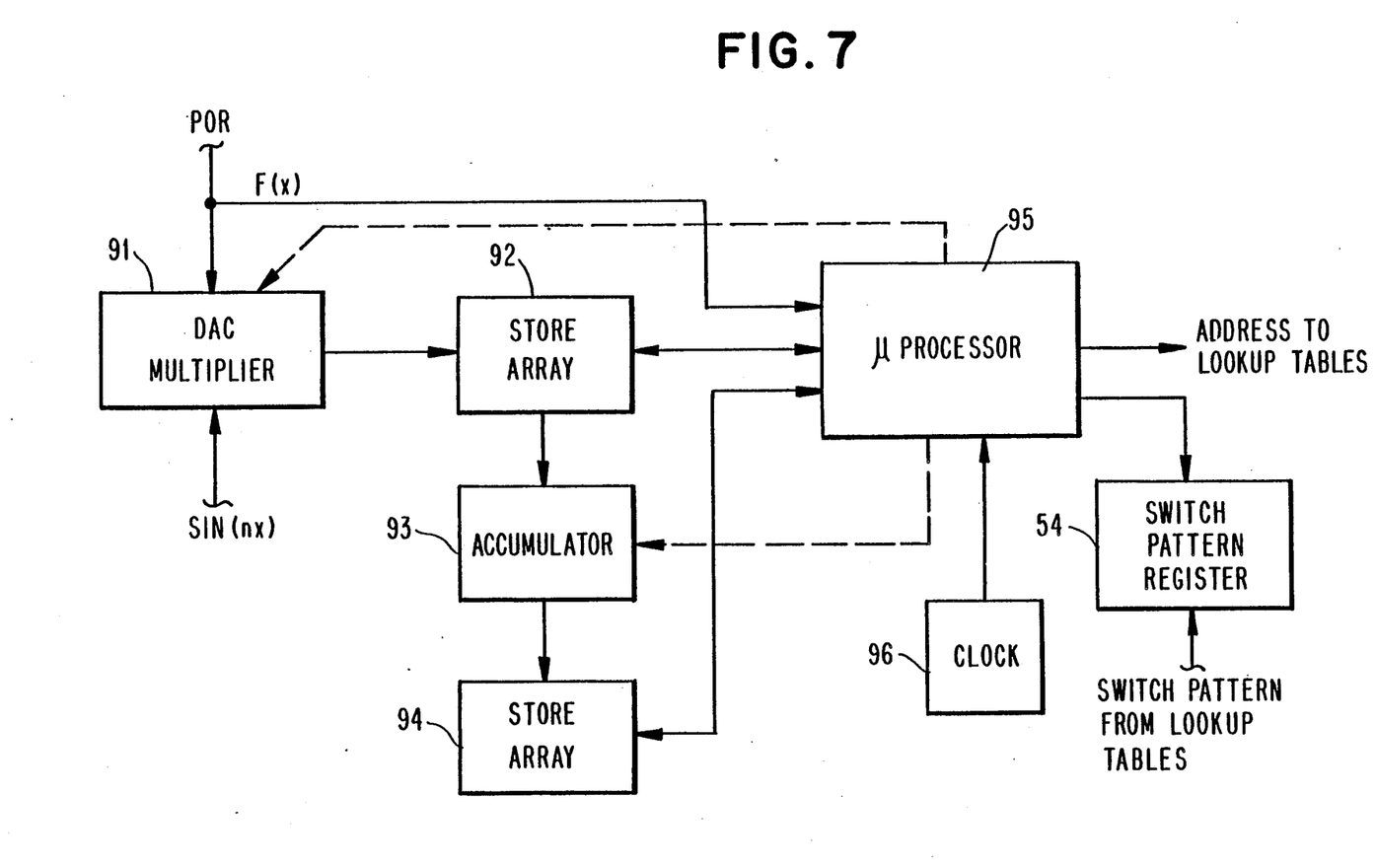
FIG. 7 is a block diagram showing one embodiment of a vernier control and monitoring system in accordance with the present invention.

FIG. 7 shows an illustrative embodiment of a system to monitor the goodness of fit and provide adjustment of the vernier switching angle. This circuit may be used as the Fit Monitor 55 shown in FIG. 3 and to provide a vernier adjustment signal 56. The product F(x) of the output of filter 60 at a POR and a function sin (nX) of one harmonic are formed by a multiplier 91. The input sin (nX), (e.g., n=3, 5, 7, 9, 11 and 15) are multiplexed and the output products of multiplier 91 are stored in memory 92. Accumulator 93 performs the integration function. The contents of these accumulating registers are stored in store array 94 which is addressed by microprocessor 95.

A clock 96 is synchronized with the fundamental of the inverter output waveform. Clock 96, which is conventionally composed of an oscillator, counters and decoding circuitry, in combination with microprocessor 95 establishes the period of the integration and the width of each neighborhood. The microprocessor 95 resets the accumulators which perform the integrating function at the beginning of each cycle. The microprocessor 95 monitors the accumulator 93 for each harmonic to detect zero crossing of the function in the respective neighborhoods.

Figure 8:
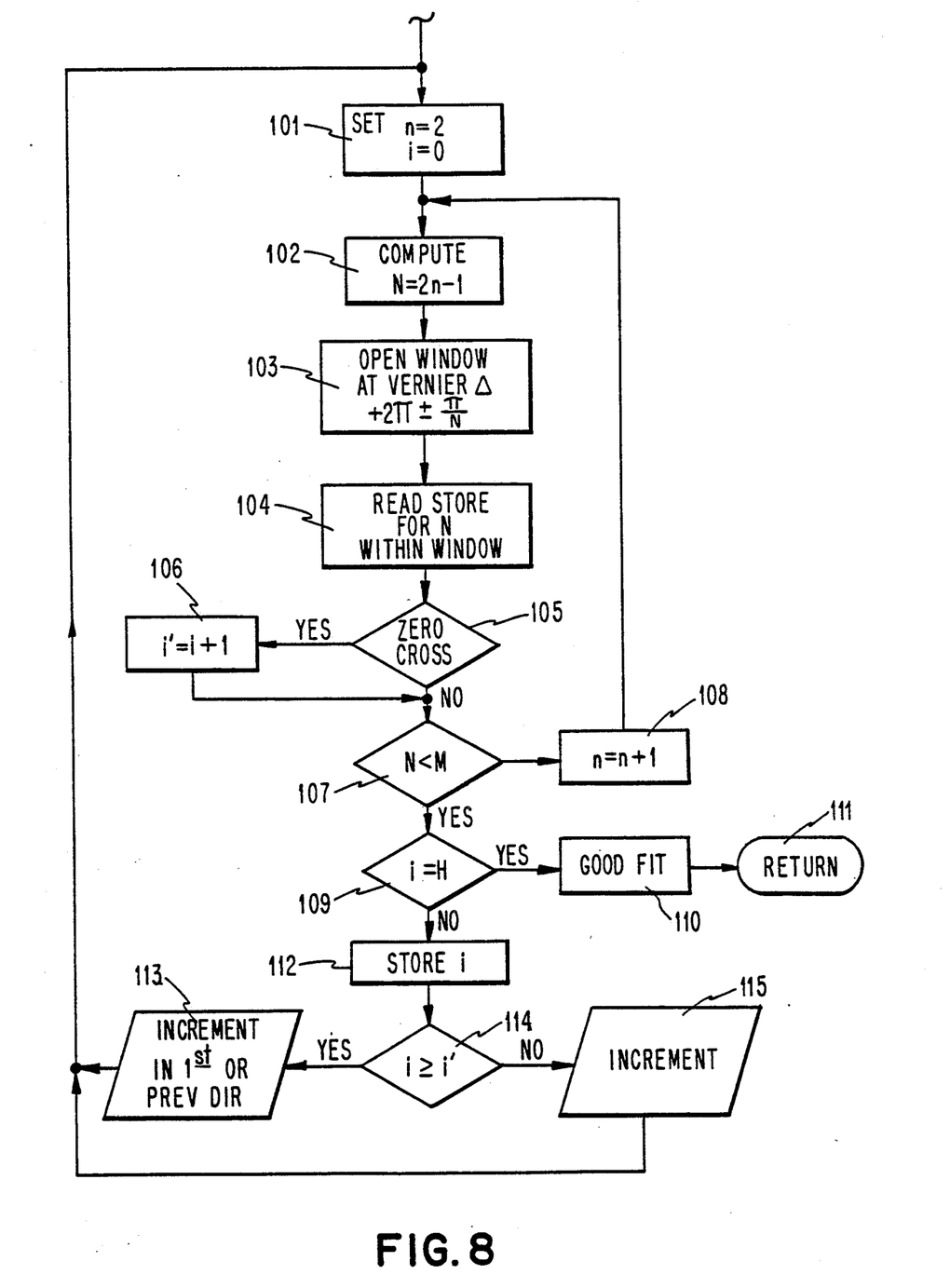
FIG. 8 is a flow diagram of the microprocessor operation of FIG. 7.

Referring now to FIG. 8 as well as FIG. 7, the microprocessor 95 monitors the goodness of fit of the pattern for the particular load conditions and provides an incremental change in the vernier switching angle and related angles if the fit is bad. The microprocessor operation represented by the flow diagram contemplates an iterative process in which each of the harmonics of interest is examined sequentially.

The flow chart contemplates odd harmonics of interest; in the initialization block 101, the number of iterations is set initially at 2 and the crossover count c initialized at ZERO. Block 102 computes the harmonic number N; in this example, the first harmonic of interest is the third (2N−1). Next in block 103 the processor 95 determines the neighborhood for the harmonic; i.e., pi/N on either side of 2 pi. The values of the integral within the neighborhood are read from store 94 in block 104 and examined in block 105 to see if the function passes through ZERO within the neighborhood. If yes, a count is accumulated in block 106. If not, no count is accumulated.

The process is repeated for each of the controlled harmonics (e.g., 3, 5, 7) Block 107 compares the harmonics number N with the highest harmonic number of interest M. If it is less, n is incremented by one (block 108) and the process is repeated. When equals the highest harmonic of interest, block 109 examines the accumulated count cf crossovers i. If the count is equal to the number of harmonics examined H, the fit is good, block 110, the process returns to the initial condition and is repeated. It will be appreciated that the process may, if desired, monitor the distribution of crossovers with respect to the midpoint (here 2 pi). Evenness of distribution of crossovers with respect to the midpoint may be used as a monitor of "goodness of fit."

If the number of crossovers does not equal the number of controlled harmonics, the number i is stored in block 112 and an output from microprocessor 95 moves the vernier switching angle in a first direction by a predetermined increment, block 113, since in the comparison in block 114 the count i exceeds the previous count i' for this initial increment. With the vernier switching angle thus incremented the above-described process is repeated for all the controlled harmonics. If this time the count i equals the number of controlled harmonics, the fit is good. Again, the evenness of distribution of crossovers with respect to the midpoint may be monitored as an indication of goodness of fit or as an indication of whether movement of the switching angles is improving the fit. If it does not, the new count i is stored (block 112) and the new count compared with the previously stored count. If the new count is greater than or equal to the stored count, the vernier switching angle is again incremented in the same direction as the previous incrementation, block 113. If the new count is less than the stored count, the vernier switching angle is incremented in the opposite direction. The total number of increments are counted so that the moved switching event does not interfere with the next adjacent event. If the limit is reached without achieving a satisfactory fit, the situation is tolerated or a new pattern is selected.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of monitoring the harmonic content of the output of a pulse width modulated d.c. to a.c. inverter comprising the steps:
   integrating the product of the inverter output and each harmonic of interest over a period equal to the fundamental of the inverter a.c. output;
   monitoring for each harmonic the crossing of a predetermined value of said product within a predetermined neighborhood extending on each side of a midpoint.

2. A method of monitoring the harmonic content of the output of a pulse width modulated d.c. to a.c. inverter as in claim 1 wherein said neighborhood is an interval of one half the a.c. fundamental output divided by the number of the harmonic which forms the product.

3. A method of monitoring the harmonic content of the output of a pulse width modulated d.c. to a.c. inverter as in claim 2 wherein said midpoint is a point where said product for each harmonic would pass through said value if the harmonic content for said each harmonic is within an acceptable level.

4. A method of monitoring the harmonic content of the output of a pulse width modulated d.c. to a.c. inverter as in claim 1 wherein said midpoint is a point where said product for each harmonic would pass through said value if the harmonic content for said each harmonic is within an acceptable level.

5. A method of monitoring the harmonic content of the output of a pulse width modulated d.c. to a.c. inverter as in claim 1 wherein said predetermined value is zero.

6. A method of monitoring and adjusting the harmonic content of the output of a pulse width modulated d.c. to a.c. inverter comprising the steps:
   integrating the product cf the inverter output and each harmonic of interest over a period equal to the fundamental of the inverter a.c. output;
   monitoring for each harmonic the crossing of a predetermined value of said product within a predetermined neighborhood extending on each side of a midpoint;
   adjusting the time of occurrence of a switching point in the pulse width modulated waveform when the crossings do not meet a predetermined criteria.

7. A method of monitoring the harmonic content of the output of a pulse width modulated d.c. to a.c. inverter as in claim 6 wherein said neighborhood is an interval of one half the a.c. fundamental output divided by the number of the harmonic which forms the product.

8. A method of monitoring the harmonic content of the output of a pulse width modulated d.c. to a.c. inverter as in claim 7 wherein said midpoint is a point where said product for each harmonic would pass through said value if the harmonic content for said each harmonic is within an acceptable level.

9. A method of monitoring the harmonic content of the output of a pulse width modulated d.c. to a.c. inverter as in claim 8 wherein said predetermined criteria is that the number of crossings is equal to the number of harmonics of interest.

10. A method of monitoring the harmonic content of the output of a pulse width modulated d.c. to a.c. inverter as in claim 6 wherein said predetermined value is zero.

11. A method of monitoring the harmonic content of the output of a pulse width modulated d.c. to a.c. inverter as in claim 6 wherein said predetermined criteria is that the number of crossings is equal to the number of harmonics of interest.

12. A method of monitoring the harmonic content of the output of a pulse width modulated d.c. to a.c. inverter as in claim 6 wherein said midpoint is a point where said product for each harmonic would pass through said value if the harmonic content for said each harmonic is within an acceptable level.

* * * * *